US011855851B2

(12) United States Patent
Shiner et al.

(10) Patent No.: US 11,855,851 B2
(45) Date of Patent: Dec. 26, 2023

(54) LAZY GRAPH CONSTRUCTION WITH COMPRESSION AND A HYBRID GRAPH-RELATIONAL MODEL FOR REPRESENTING A NETWORK TOPOLOGY

(71) Applicant: Ciena Corporation, Hanover, MD (US)

(72) Inventors: Andrew D. Shiner, Ottawa (CA); Frederic Poulin, Gatineau (CA); Alex W. MacKay, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/690,464

(22) Filed: Mar. 9, 2022

(65) Prior Publication Data

US 2023/0291653 A1  Sep. 14, 2023

(51) Int. Cl.
*H04L 41/12* (2022.01)
*H04L 41/08* (2022.01)
*H04L 41/0816* (2022.01)
*H04L 41/02* (2022.01)

(52) U.S. Cl.
CPC ............ *H04L 41/12* (2013.01); *H04L 41/024* (2013.01); *H04L 41/0816* (2013.01); *H04L 41/0886* (2013.01)

(58) Field of Classification Search
CPC ... H04L 41/12; H04L 41/024; H04L 41/0816; H04L 41/0886
See application file for complete search history.

(56) References Cited

U.S. PATENT DOCUMENTS

| | | | |
|---|---|---|---|
| 8,364,036 B2 | 1/2013 | Boertjes et al. | |
| 9,116,975 B2* | 8/2015 | Shankar | G06F 16/248 |
| 9,143,238 B2 | 9/2015 | Roberts et al. | |
| 9,806,803 B2 | 10/2017 | Bownass et al. | |
| 10,256,939 B2* | 4/2019 | Zhang | H04J 14/0257 |
| 10,348,410 B1 | 7/2019 | Charlton et al. | |
| 10,361,957 B1 | 7/2019 | MacKay et al. | |
| 10,419,109 B1 | 9/2019 | Oveis Gharan et al. | |
| 11,038,549 B1 | 6/2021 | Harley et al. | |
| 11,070,286 B1 | 7/2021 | Shiner et al. | |
| 11,228,383 B2 | 1/2022 | Shiner et al. | |

(Continued)

FOREIGN PATENT DOCUMENTS

| | | |
|---|---|---|
| EP | 3 107 255 B1 | 5/2018 |
| WO | 2020/198574 A1 | 10/2020 |

(Continued)

*Primary Examiner* — Sm A Rahman
(74) *Attorney, Agent, or Firm* — Baratta Law PLLC; Lawrence A. Baratta, Jr.

(57) ABSTRACT

A lazy graph construction with compression includes receiving a query related to a network; one of generating a site graph for the network and accessing the site graph already in memory; performing a search on the site graph based on the query; accessing data in a database and generating, in the memory, a plurality of sub-graphs using the data, for the query; and providing a solution to the query based on the search and a search of the plurality of sub-graphs. The site graph can be at a site level and includes network elements and associated connections in the network, and the plurality of sub-graphs can be at an intra-site level including any of component-to-component connections and intra-component connections.

20 Claims, 13 Drawing Sheets

(56) References Cited

U.S. PATENT DOCUMENTS

| | | | |
|---|---|---|---|
| 2010/0158528 A1* | 6/2010 | Resende | H04L 45/62 |
| | | | 398/79 |
| 2016/0055226 A1* | 2/2016 | Bruening | G06F 16/9024 |
| | | | 707/611 |
| 2018/0205454 A1 | 7/2018 | Shiner et al. | |
| 2018/0241468 A1 | 8/2018 | Shiner et al. | |
| 2018/0351825 A1* | 12/2018 | Thomson | G06F 11/3051 |
| 2018/0359029 A1 | 12/2018 | Shiner et al. | |
| 2019/0303498 A1* | 10/2019 | Saha | G06F 16/367 |
| 2019/0383699 A1 | 12/2019 | Shiner et al. | |
| 2021/0126734 A1 | 4/2021 | Shiner et al. | |

FOREIGN PATENT DOCUMENTS

| WO | 2021/081666 A1 | 5/2021 |
|---|---|---|
| WO | 2022/006395 A1 | 1/2022 |

* cited by examiner

LAZY GRAPH CONSTRUCTION WITH COMPRESSION AND A HYBRID GRAPH-RELATIONAL MODEL FOR REPRESENTING A NETWORK TOPOLOGY

FIELD OF THE DISCLOSURE

The present disclosure generally relates to networking. More particularly, the present disclosure relates to systems and methods for lazy graph construction with compression and a hybrid graph-relational model for representing a network topology.

BACKGROUND OF THE DISCLOSURE

A network generally includes nodes and links that connect the nodes. This can be the case for optical networks, time division multiplexed (TDM) networks, packet networks, etc. as well as multi-layer networks. A state of the network can be represented by a network graph with nodes (also known as network elements) as vertices (which can also be referred to as nodes) and the links (also known as connections) between the nodes as edges in the graph. The nodes and edges can contain behavior models, provisioned or measured properties along with any other data related to those elements. Nearly any piece of information related to the state of a network could be represented on the networks graph. Many network graphs are possible, and the choice of representation and required level of detail varies significantly by application. For some applications, a graph of reconfigurable optical add/drop multiplexer (ROADM) sites with connections between them may be sufficient. In other cases, it is desirable to represent the individual fibers and amplifiers along each of the available paths between ROADM sites. A ROADM site may be represented as a simple node/vertex or we may need to represent the detailed structure within the ROADM and the partial connectivity between ROADM degrees. While there is sufficient data to produce a highly detailed graph that encompasses the above examples, it is often inefficient to work with this level of detail and may not be possible given the computer's memory constraints.

With complex, large networks, the very large graphs required for multi-layer routing are impractical to store in memory. Graph traversal can be very slow unless most of the required data is available in memory. It can be impractical to represent everything that is known about a network on an in-memory graph both because of the large memory required as well as the time required to construct a graph with all available detail. A pure graph representation is not ideal for network topology because the graph necessarily contains the full detail of everything that is known about the network which can make the graph slow to traverse. There are also many questions that we might ask of the network model which are better suited to relational queries such as 'identify all services where the bit error rate (BER) is >0.1%'. That is, graphs are good for some queries whereas databases are better for other queries.

There is a need for a hybrid approach that utilizes a graph that can be fully stored in memory coupled with a relational model that collectively represent the network topology.

BRIEF SUMMARY OF THE DISCLOSURE

The present disclosure relates to systems and methods for lazy graph construction with compression and a hybrid graph-relational model for representing a network topology. The hybrid graph-relational model includes the complete network state stored in a database and required in-memory graphs can be generated from the database by user defined generator functions. Generator functions can be attached to any node or edge on a parent graph with instructions that describe how to reach back into the database in order to construct a required sub-graph. We refer to this as lazy graph construction. There can be a hierarchy of graphs such as a site level graph under which we may have a ROADM graph. A fiber module located on a node of the ROADM graph may have its own internal connectivity graph. This hierarchy of graphs is similar to the idea that the world is carried on the back of a turtle which is standing on the back of another turtle where it is 'turtles all the way down.' We refer to this model as the Turtles Model or Framework.

It is not always advantageous to construct a sub-graph in order to answer a particular question. For example, when routing across a site level graph, a Dijkstra kernel may reach a given site and ask 'what adjacent sites can be reached from here given particular spectral constraints.' To answer questions like this, we introduce compression functions which are application specific functions that are places on chosen nodes or edges on a graph. The compression function may answer the question by constructing and traversing a sub-graph with a generator function. It could also apply some other internal algorithm, possibly supported by data from the database; or it may already have the answer in its cache. The combination of lazy graph construction with compression allows for compact in-memory representations of part of a network that is required for an algorithm. We can access cached results during graph traversal, efficiently deal with recognized cases such as common ROADM topologies and have a means for handling odd ball cases from first principles by constructing and traversing sub-graphs.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. The steps include receiving a query related to a network; one of generating a site graph for the network and accessing the site graph already in memory; performing a search on the site graph based on the query; accessing data in a database and generating, in the memory, a plurality of sub-graphs using the data, for the query; and providing a solution to the query based on the search and a search of the plurality of sub-graphs.

The site graph can be at a site level and includes network elements and associated connections in the network, and the plurality of sub-graphs are at an intra-site level including any of component-to-component connections and intra-component connections. The generating can be based on pre-defined generator functions that include instructions for the sub-graphs which are attached to a specific node or edge in the network or to the network graph itself. Any node, edge or graph in the network can include a plurality of generator functions. The steps can further include utilizing a compression function associated with any node where the compression function includes instructions for answering specific questions. The plurality of sub-graphs can include add/drop graphs at a source node and a destination node, and wherein the compression function can be used at intermediate nodes for degree-to-degree interconnectivity. The query can be a request for a path, and the solution can include any of a wavelength, connectivity for add/drop, a network path, and connectivity at intermediate nodes.

The search and the generating can be performed asynchronously to one another. The steps can further include utilizing graph versioning with branching and merging such that the site graph supports multi-user concurrent operation. The steps can further include utilizing an object relational mapper (ORM) to manage graph objects in the database.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
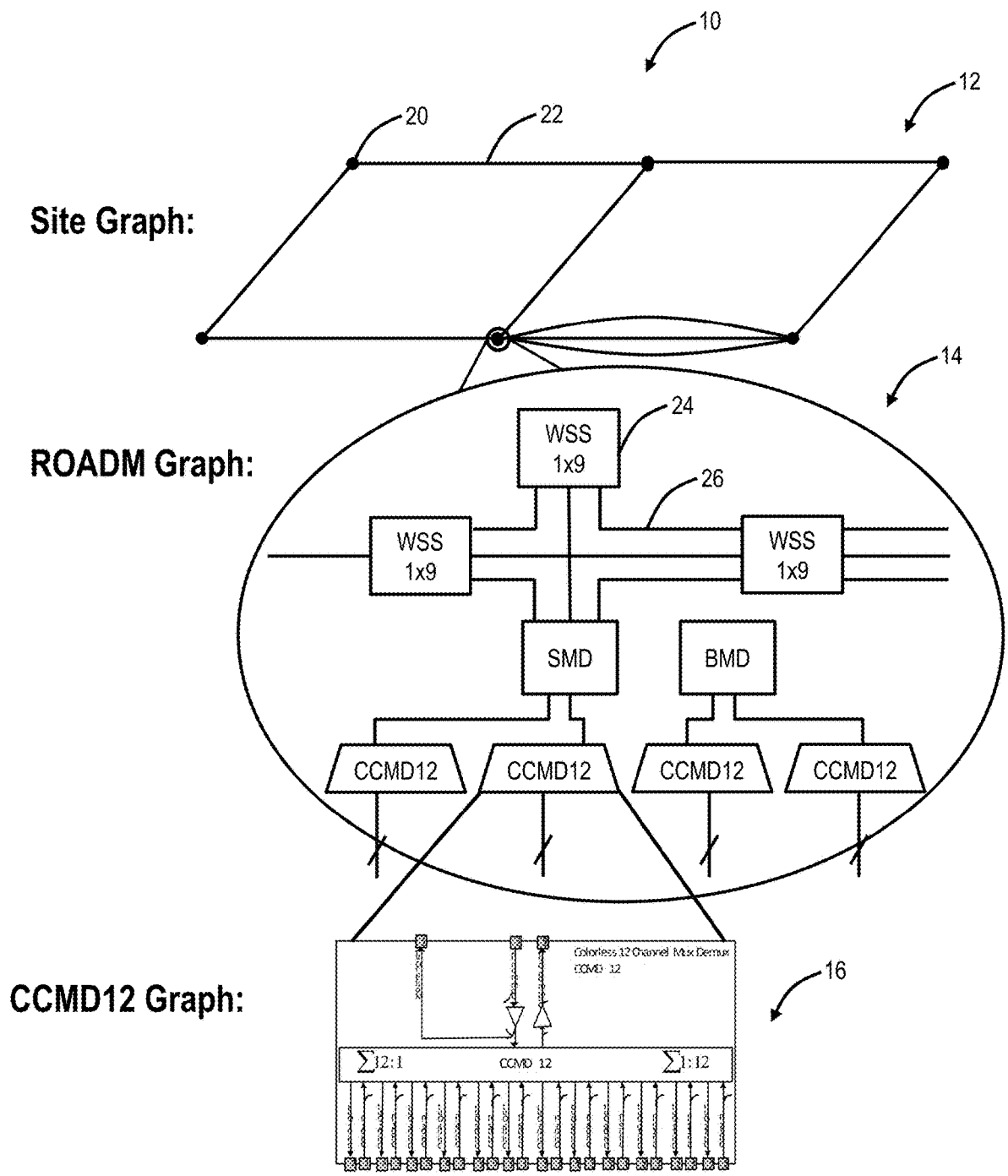
FIG. 1 is a diagram of a network graph that includes a site graph, a ROADM graph, and a colorless channel multiplexer/demultiplexer (CCMD) graph.

Again, the present disclosure relates to systems and methods for lazy graph construction with compression and a hybrid graph-relational model for representing a network topology. For a number of teams, access to network topology with the required level of detail was a barrier when trying to develop new algorithms. Each engineer or small team crafted their own solution and prototypes built with their craft data model are difficult and time consuming to transition into a product with such as with a network management system (NMS) or planning system.

The approach of lazy graph construction with compression has been used to produce very performant prototypes. For example, on a nationwide optical network, the optical multiplex section (OMS) level graph can be queried and constructed in 24 ms plus an additional 24 ms to get the distances between each ROADM site (which requires tracing the fiber path). A port level representation for a larger ROADM site (200+ cards, 500+ intra node connections), can be constructed with a ~176 ms query and 13 ms of graph construction time.

The ability to associate multiple graph generators with an edge means that it is possible to augment an existing model to add new functionality with minimal disruption. For example, we will do network routing across the OMS level graph but for noise modeling detailed sub-graphs will be generated in between each pair of ROADM sites with the data required for amplifier and fiber physical modeling.

Lazy graph construction will be particularly useful when operating across multiple layers of a network where we can load detailed multi-layer graphs at the end points as well as the full L0 topology between sites. That is, while descriptions herein are generally focused on Layer 0 (L0) photonic/optical networks, those skilled in the art will appreciate any network layer is contemplated, as well as multi-layer implementations.

Lazy graph construction can support asynchronous or multi-threaded routing strategies. Prior to searching for a L0 path between sites A and Z (A being the source and Z being the destination), we can initiate the queries to build out the ROADM topologies at the A and Z sites. Once a path is found, we can route through the A and Z sites to find connections on the add/drop structures. Before routing through the sites an additional query can be initiated to build out the ROADM degree level connectivity graphs for the sites that were traversed along the path from A to Z. Note that graphs for the connections between degrees at the traversed sites, as well as for the add/drop structures in the A and Z sites, are only needed if the compression functions cannot solve for the site connectivity through other means.

Summary of Concepts

The present disclosure includes 1) lazy graph construction with compression, 2) a hybrid graph-relational model, 3) intelligent Dijkstra (and other algorithms), 4) graph branching and versioning, and 5) multi-user concurrency.

1) lazy graph construction with compression—The level of detail relevant to a network graph depends on the problem to be solved. Starting from a high-level graph, such as one that represents the connection between sites, we may wish to descend into more detailed representations such as the ROADM structure, or the internals of various modules. Lazy Graph Construction allows generators to be attached to graph nodes which can generate required sub-graphs as needed. Compression functions can be attached to nodes to answer specific questions either by generating and descending into a sub-graph or determining the answer through other means.

2) a hybrid graph-relational model—Enabling generators and compression functions requires a common understanding of the complete network state from which the functions can extract required attributes. This source of truth is provided by a relational database with a normalized schema that ensures internal consistency. An Object Relational Mapper (ORM) moderates the creation of, and changes to, all graph objects. This minimizes database interactions, and insuring synchronization between instances of graph objects.

3) intelligent Dijkstra (and other algorithms)—The Dijkstra kernel is not limited to traversing a static graph. An application specific kernel can look for expected generator or compression functions upon reaching a new node or edge and include interaction with those functions as part of its exploration. For example, upon reaching a new site on a specific port the kernel may ask a compression function 'which ports can be reached from here'. The compression function may already know the answer, or it may call a ROADM site generator and search for connected ports on the ROADM sub-graph.

4) graph branching and versioning—A network graph is constructed by a generator function from data in a relational database. It is relatively straight forward to add keys indicating a version and a branch to the tables in a relational database. With this approach, we can produce a version-controlled network graph and easily move between branches and versions. With a branching and versioning model operations that require a static graph, such as routing, can operate on a recent branch while the primary graph (master branch) continuously updates in response to changes in the real network.

5) multi-user concurrency—Web-applications that provide features such as routing, network defragmentation, etc. need to run long calculations on graphs which are partially held in memory. Users can select which branch and version of the graph they want to interact with, and the web application event handlers will direct their events to the appropriate graph instance. Multiple read only users can share the same in memory graph. When a user wants to modify the graph, for example by placing a new service, a new branch is created, and the user's traffic is directed to a new graph instance.

Hybrid Graph Relational Model

FIG. 1 is a diagram of a network graph 10 that includes a site graph 12, a ROADM graph 14, and a colorless channel multiplexer/demultiplexer (CCMD) graph 16. The state of a network may be described by its network graph 10. The full representation of a network, even at layer 0, requires a huge number of nodes and edges, as illustrated in FIG. 1. Details such as the locations of fans and the detailed topology of each ROADM site are not of interest for many applications. That is, the network graph 10 in its totality can include practically any information related to the network, down to a module and even component level. At higher layers the size of the graph increases by orders of magnitude and the computational effort required to construct the full network graph as well as the memory required to hold it transitions from challenging to prohibitive.

Algorithms such as those used for network routing require very fast access to a subset of the graph topology as well as some graph attributes. It is necessary to store most of the information required for the algorithm in memory.

We introduce a hybrid graph-relational model where complete information about the network state is stored in a relational database and graph generator functions construct a required in-memory graph representation from data extracted from the database. We note that this approach generalizes to other databases such as NoSQL. Additional generators can be attached to nodes and edges of a parent graph and used to construct more detailed sub-graphs when needed.

Compression functions attached to the nodes or edges of a graph contain instructions for answering specific questions such as 'what ports can be reached form here' either by constructing a sub-graph or through other means such as by returning cached results or through a database query.

Sub-Graph Levels

Every node or edge in the graphs 12, 14, 16 is an object. To represent the network in various levels of detail we allow for the creation of sub-graphs under each object. In FIG. 1, the site graph 12 covers a network level where every node 20 is a site or network element and every edge 22 is a connection between the sites. At a node 20, there can be the ROADM graph 14 that covers intra-site or network element configuration, where every node 24 is a component or module and every edge 26 is an intra-component or module connection. For example, the nodes 24 can include a wavelength selective switch (WSS) for degrees and multiplexer/demultiplexers (SMD, BMD, CCMD) for local channel add/drop. There can be a further sub-graph 16 for the internal structure of multiplexer/demultiplexers.

Generator Functions

Figure 2:
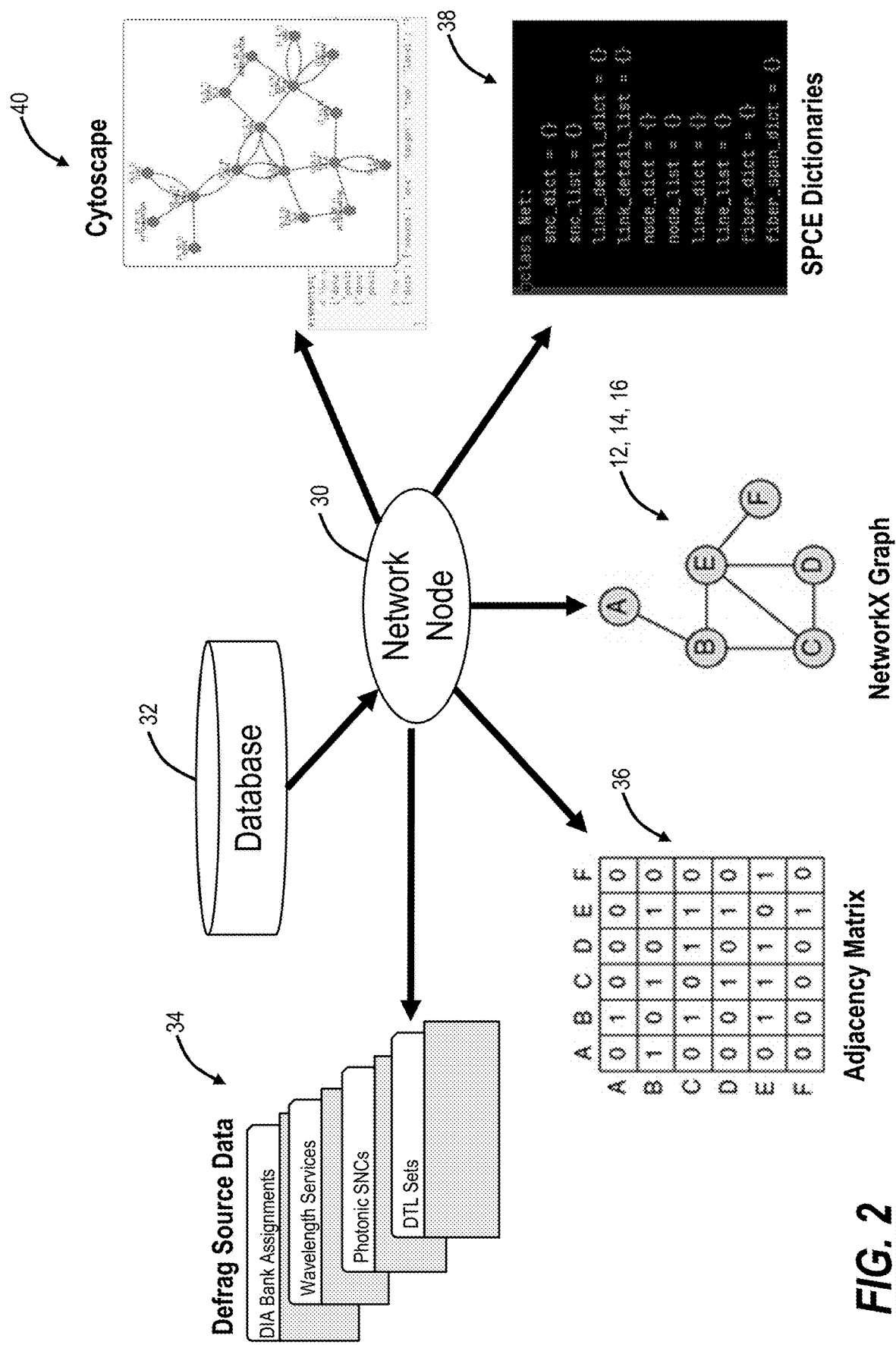
FIG. 2 is a logical diagram of a network node and associated generator functions.

FIG. 2 is a logical diagram of a network node 30 and associated generator functions. Generator functions attached to an object contain instructions for building a sub-graph under that object starting with the object name as a key. The generator contains instructions for constructing a required sub-graph using queries into a database (DB) 32 as well as business logic contained within the generator. Objects can be specified to varying levels of granularity through an object inheritance model. Those skilled in the art will recognize that the graph generation may be generalized to a plurality of possible graph representations including adjacency list, connectivity matrix, directed or undirected graphs or multi-graphs as well as for other representations of topology or other data such as reports, summaries, key value stores and the like.

The generator functions can use data in the database 32 to form the graphs 12, 14, 16, to provide data for defragmentation 34 (bank assignments, wavelength services, photonic sub-network connections (SNC), designated transit lists (DTL), and the like, to provide an adjacency matrix 36, for scalable path computation engine (SPCE) dictionaries 38, for input to programs such as Cytoscape 40, and the like.

Compression Functions

Figure 3:
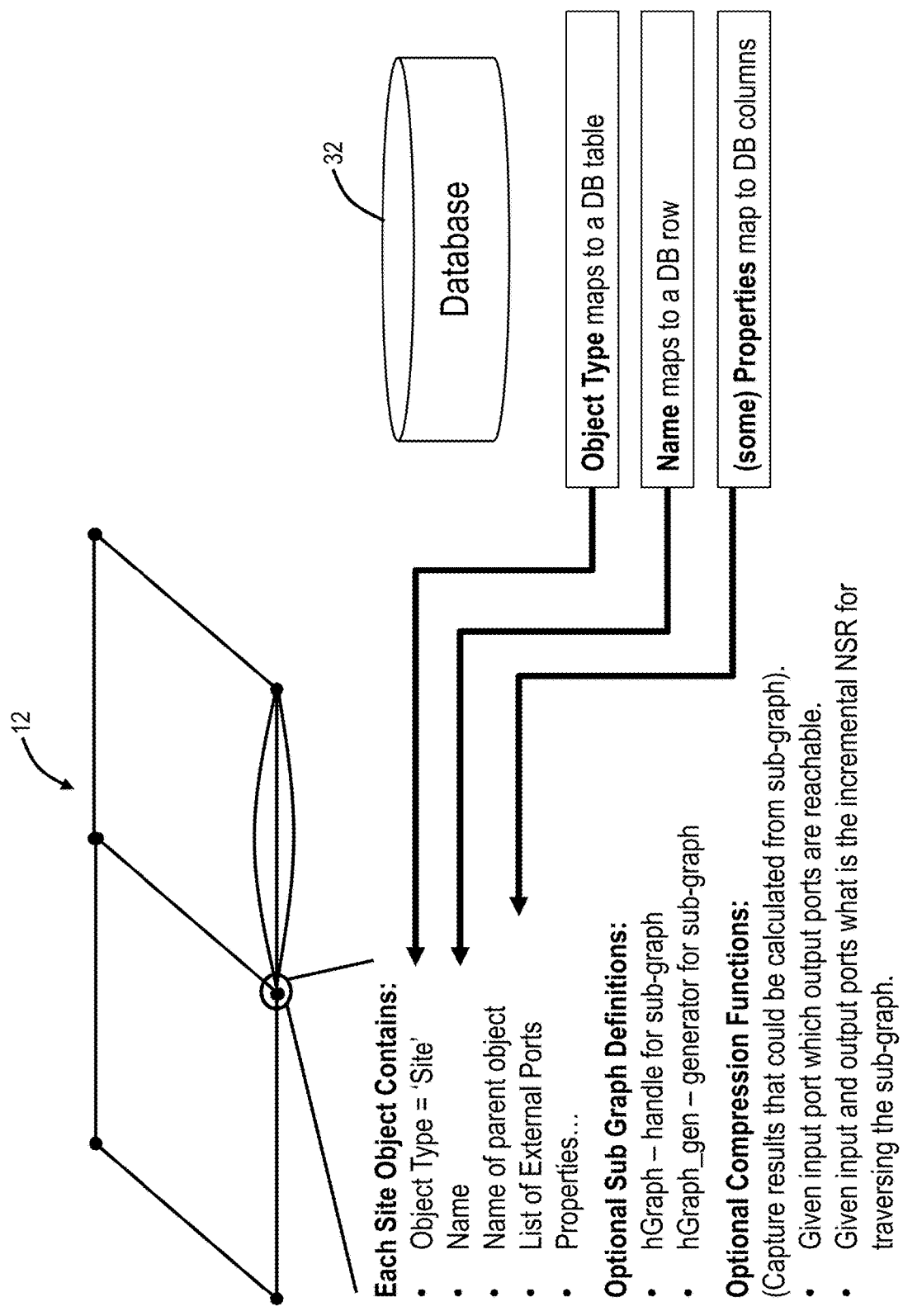
FIG. 3 is a diagram of compression functions.

FIG. 3 is a diagram of compression functions. Starting from a node that advertises its external ports, we could test for connectivity between those ports by building and then descending into the node's sub-graph. In some cases, the connectivity between external ports may have already been computed, or might be determined through some other means. A compression function can be defined to answer specific questions and will only use or build the sub-graph if necessary. The function could also persist those results and determine if the sub-graph should be kept.

Examples compression functions could:
Determine port connectivity
Calculate incremental NSRs
Store restoration path behavior Regarding data in the database 32, each site can include an Object Type='Site,' Name, Name of parent object, List of External Ports, Properties, and the like. The object type can map to a database table, the name can map to a database row, and the properties can map to some columns in the row. There can be Optional Sub Graph Definitions
hGraph—handle for sub-graph
hGraph_gen—generator for sub-graph
There can be Optional Compression Functions:
(Capture results that could be calculated from sub-graph).
Given input port which output ports are reachable.
Given input and output ports what is the incremental NSR for traversing the sub-graph.

Object Relational Mapping (ORM)

Figure 4:
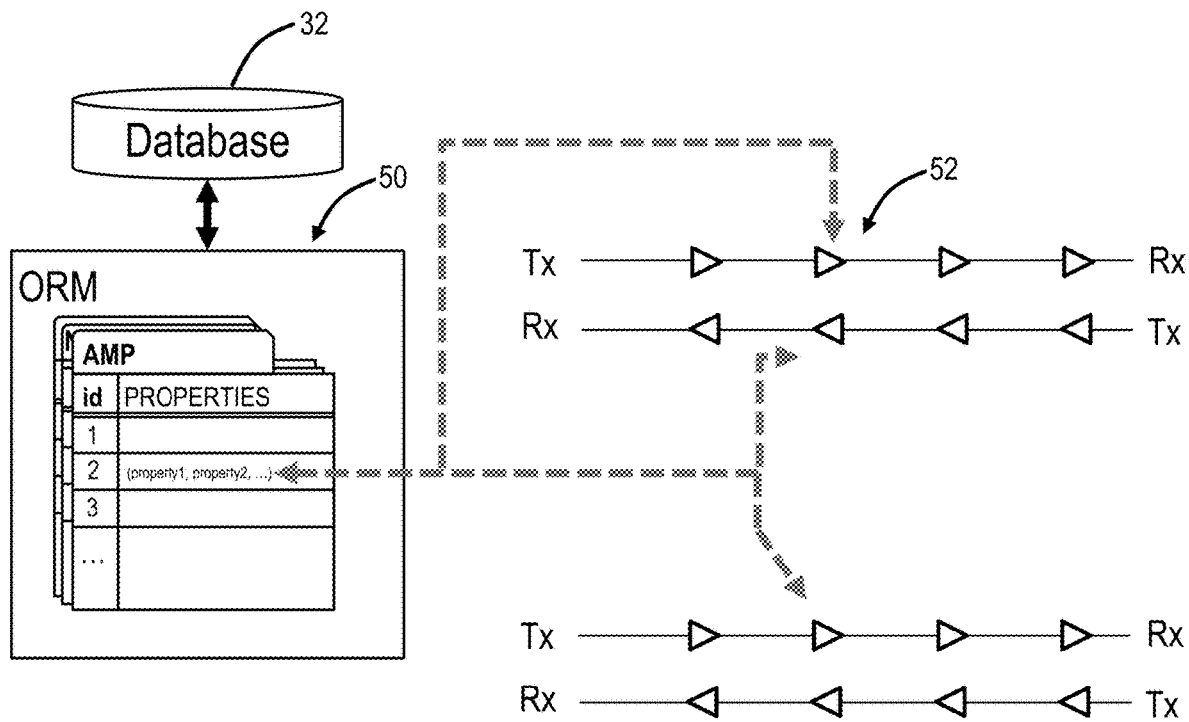
FIG. 4 is a diagram of object relational mapping (ORM).

FIG. 4 is a diagram of object relational mapping (ORM) 50. The ORM 50 is used to manage interactions between graph objects and the DB 32. It ensures consistency and helps to minimize DB interactions. Multiple representations for a section between two nodes could be defined and built by their associated generators. The first time an AMP 52 is used, its properties are fetched from the DB 32 and stored in the ORM 50. The amp object attributes point back to the values stored in the ORM 50. If the same amp is used on a different sub-graph, the ORM 50 passes a reference to the same value that is used in the first sub-graph.

If an attribute changes, all instances of the associated object are instantly updated because they reference the same memory location. If we know other amps will be instanced, eager fetching methods can be used to cache the full AMP table using a single database query. The ORM 50 tracks all changes to instrumented objects. Once the 'unit of work' is completed any changes can be committed back to the database 32 in a single operation.

Example Routing Request from A to Z

Figure 5:
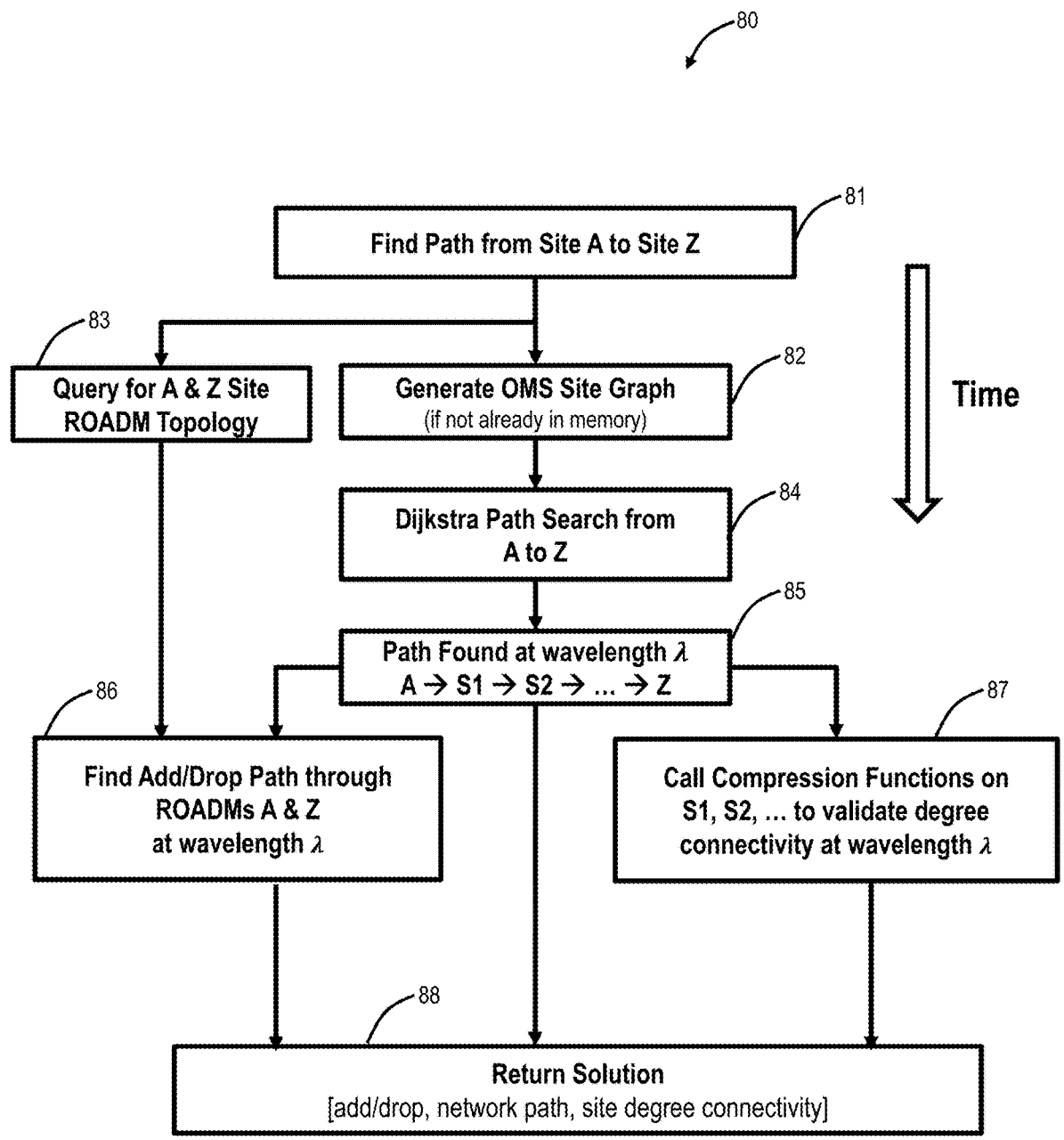
FIG. 5 is a flowchart of a routing process that utilizes the various approaches described herein for finding a path from a node A to a node Z.

FIG. 5 is a flowchart of a routing process 80 that utilizes the various approaches described herein for finding a path from a node A to a node Z. The routing process 80 can be implemented as a method having steps, via a processing device with one or more processors configured to execute the steps, and as instructions for the steps stored in a non-transitory computer-readable medium. The routing process 80 can be implemented at a network element, such as on a controller, via a network management system (NMS), via a software defined networking (SDN) controller, via a planning system, via a path computation engine (PCE), a control plane, and the like.

When finding a path between two sites we use lazy graph construction to build required topology which is traversed once required inputs are available. Prior to routing across the OMS-Site graph, an asynchronous call to build the end point ROADM topology can be made in anticipation that a path will be found. Once path(s) are found, there is routing through the ROADMs to the add/drop structures. Asynchronous to the add/drop routing, there is a verification that there is connectivity through the degrees at each site along the path. This can be done by calling a compression function at each site which may call a generator to build the partial ROADM topology (the add drop structure is not needed). The solution is complete once we have paths through the add/drop structures, a path across the networks and have verification of degree connectivity.

The process 80 includes receiving a request to find a path from site A to site Z (step 81). The process 80 include generating an OMS site graph, if not already in memory (step 82), and querying the site A and site Z ROADM topology (step 83). For example, the OMS site graph can be the site graph 12, and the ROADM topology can be the ROADM graph 14. Of note, the process 80 supports parallel, concurrent, or asynchronous flows. The process 80 includes performing a path search from the sites A to Z, such as using a path finding algorithm including Dijkstra (step 84). Those skilled in the art will recognize the process 80 contemplates any type of routing, modulation, and spectrum assignment (RMSA) or routing, and spectrum assignment (RSA) algorithm.

The output of the path search includes a path on a given wavelength, λ, through a set of nodes, i.e., wavelength λ from sites A→S1→S2→ . . . →Z (step 85). Next, the process 80 includes finding an add/drop path through the ROADMs at the sites A, Z at wavelength λ (step 86), and calling compression functions on the sites S1, S2, . . . to validate degree connectivity at wavelength λ (step 87). The process 80 returns a solution that includes the wavelength λ from sites A→S1→S2→ . . . →Z, add/drop details at the sites A, Z, the network path, site degree connectivity at the intermediate sites, etc. (step 88).

Example Network Implementation

Figure 6:
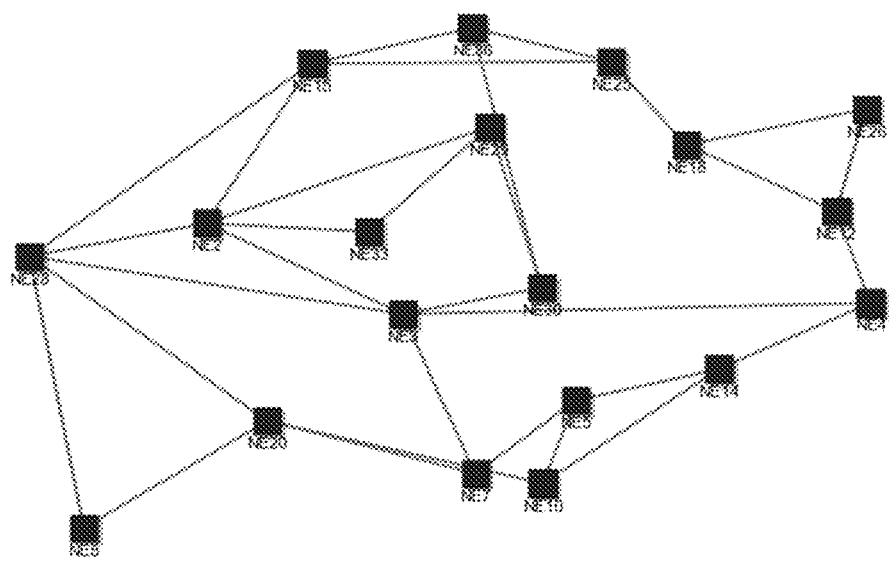
FIG. 6 is a diagram of a site level graph for a nationwide network and an example ROADM graph for a site.
Figure 6:
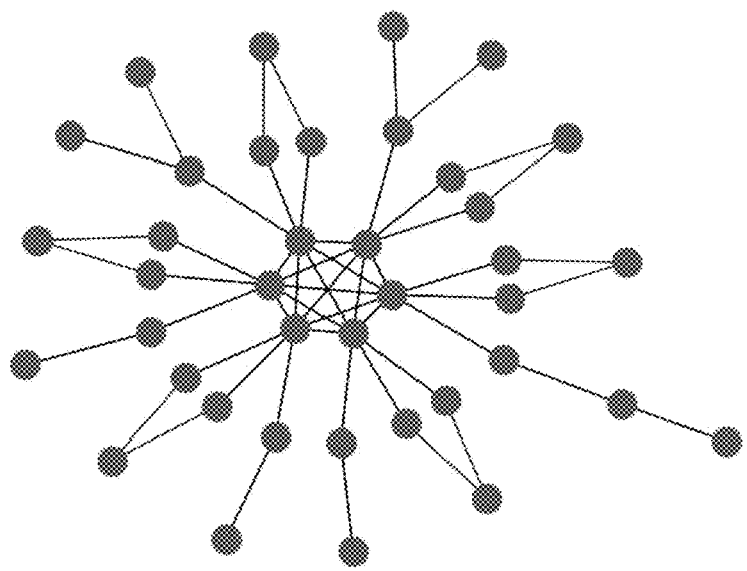

FIG. 6 is a diagram of a site level graph 12 for a nationwide network and an example ROADM graph 14 for a site. This example implementation utilizes a relational database with objects included therein and with an SQL Alchemy ORM. The time to build site graph including DB queries, creating site and fiber object instances and assembling NetworkX graph was on the order of a couple seconds (the network had 700+ sites and 1000+ fibers).

The ROADM graph 14 was for an interesting site in the network with significant degrees and connectivity, namely transaction language-1 identifiers (TID) which are unique network element identifiers. In Python we define simple objects: NetworkElement( ) and RoadmInterconnect( ) For a given TID we:

Query all NetworkElements that match that TID and place the NetworkElements on the nodes of a NetworkX graph.

Query all connections between NetworkElements at that TID and instantiate those connections as edges on the NetworkX graph.

Currently we can generate ~40 of these sub-graphs per second. We expect to improve this with eager fetching techniques and by building all the ROADM sub-graphs at once.

In some cases, it is advantageous to generate sub-graphs in parallel.

Find Network Elements for all ROADM sites in one query.

Find all physical connections between ROADM network elements in one query.

Organize the network elements and connections by TID and instantiate them on sub-graphs.

The preceding example showed the creation of simple site, network element and fiber connection objects in Python starting from the relational database using the SQL Alchemy ORM. Tens of thousands of instrumented objects were instanced in a few second. Objects for real world applications are expected to have significantly more attributes. ORMs can be used for modeling large L0 networks.

Graph Versioning

Figure 7:
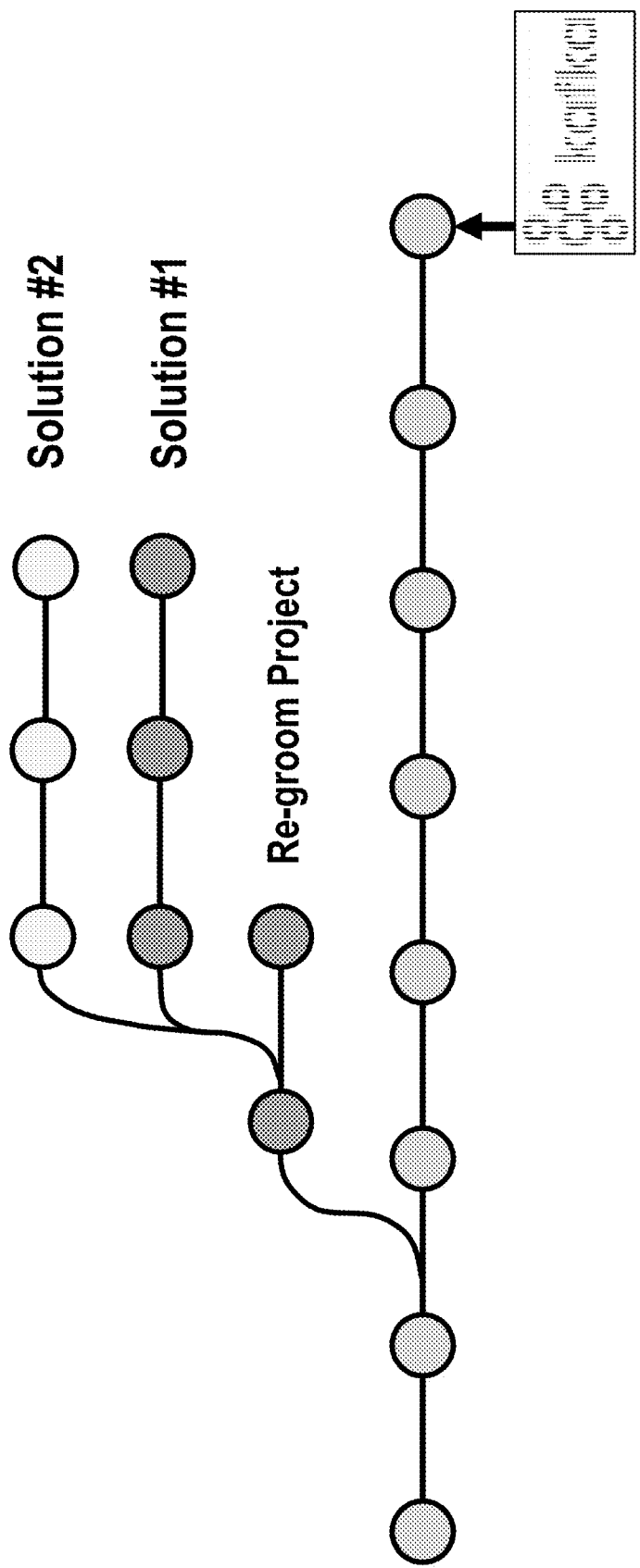
FIG. 7 is a diagram of graph versioning.

FIG. 7 is a diagram of graph versioning. The data in a relational DB 32 can be versioned using a branching and merging strategy. Routing and re-groom calculations require a static graph. With branching and versioning, an app can operate on a branch of the graph which represents the network state at one instant in time while the master branch is continuously updated to reflect changes to the network. It is possible to version control a relational database. Database versioning is described in 'Store revisions of content in PostgreSQL' by Kaustav Das Modak, available online at kaustavdm.in/versioning-content-postgresql.html, the contents of which are incorporated by reference in their entirety.

A simplified graph versioning design can include

Associating a history relation (table) with each active relation that is to be versioned. For example, the active relation may be onep_route and onep_route_history is the history relation. In practice the active relation may be a SQL view that is constructed from the _history relation.

The in memory graph is normally mapped to the active relation.

The history relation introduces additional columns of start_time, update_time and, branch_id.

branch_id is a unique id for each branch.

start_time is the time this version of the tuple first appeared.

update_time is Null if the tuple (row) is the current version for the branch_id, or is the time that the tuple was updated, and a new entry was created in the _history relation The active relation is set to represent the state of the network for a particular branch_id and a particular time. For the current view it would SELECT all entries from the _history relation that match the branch_id where the stop_time==Null. Event triggers are attached to the active relations which recognize tuple updates and automatically sets the stop_time of the corresponding tuple in the _history relation to the current time and copies the updated tuple into the _history relation with the start_time set to now( ) and the stop_time set to Null. If the active relation is not representing the current state of the chosen branch, we might choose to make it read only or create a new branch if updates are accepted.

Switching Branches/Versions: Update the active views to SELECT the desired branch and time step from the _history relations. If the physical topology and schema are unchanged, the ORM 50 might update the graph automatically on commit( ). In practice it may be safest to simply re-generate the graph although a more nuanced approach is certainly possible.

Merging: Merging branches will be much more challenging compared with branching and versioning. Simple differences like adding non-conflicting services may be able to be automated. Port conflicts for new services may be easily resolved. More complicated conflicts become a special case of re-groom.

Multi-User Concurrency

Figure 8:
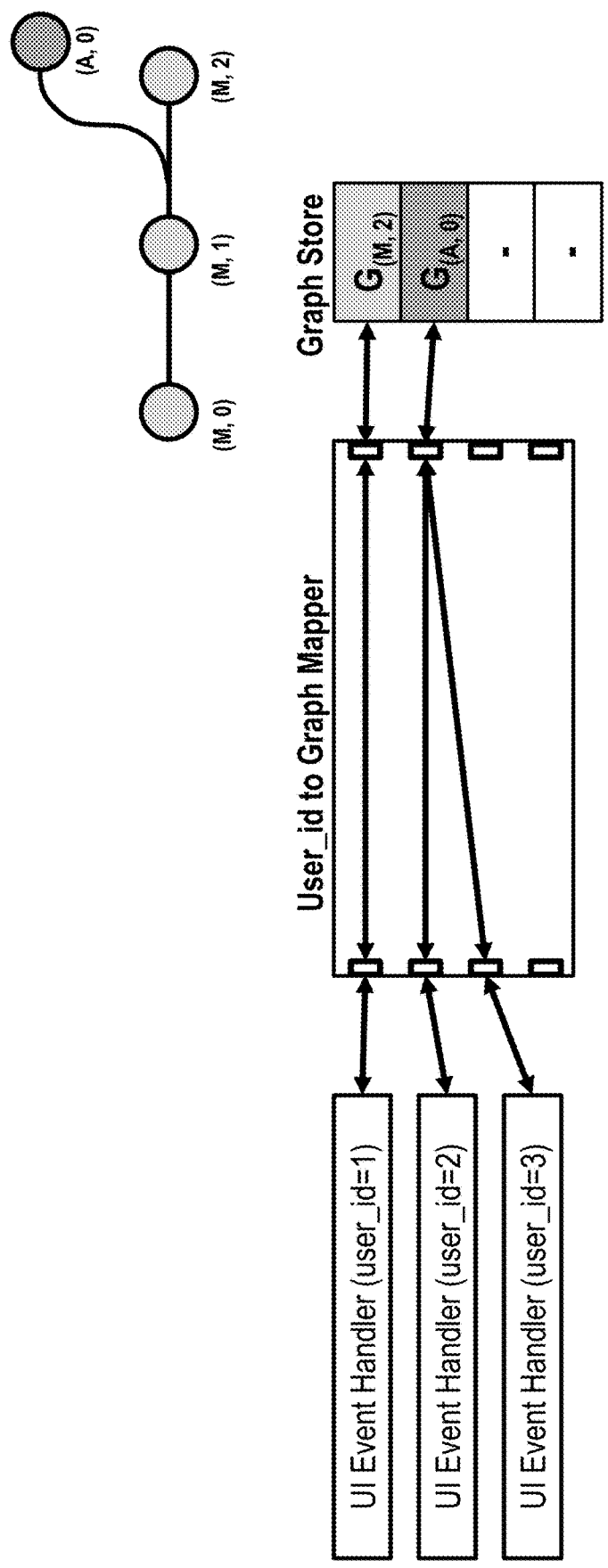
FIG. 8 is a diagram of multi-user concurrency.

FIG. 8 is a diagram of multi-user concurrency. The Turtles model is used to create in memory network graphs following a hybrid graph-relational data model. These graphs can be fully re-constructed from the relational DB data and are easily moved into and out of memory. When used as the basis for a web app, multiple users can connect simultaneously. For routing and network design applications, we expect in the range of tens to at most hundreds of concurrent users. The graphs and operations performed on them such as routing and noise modeling are memory and compute intensive. Requests from User Interface (UI) event handlers need to be routed to the appropriate graph instance for a given user.

Figure 9:
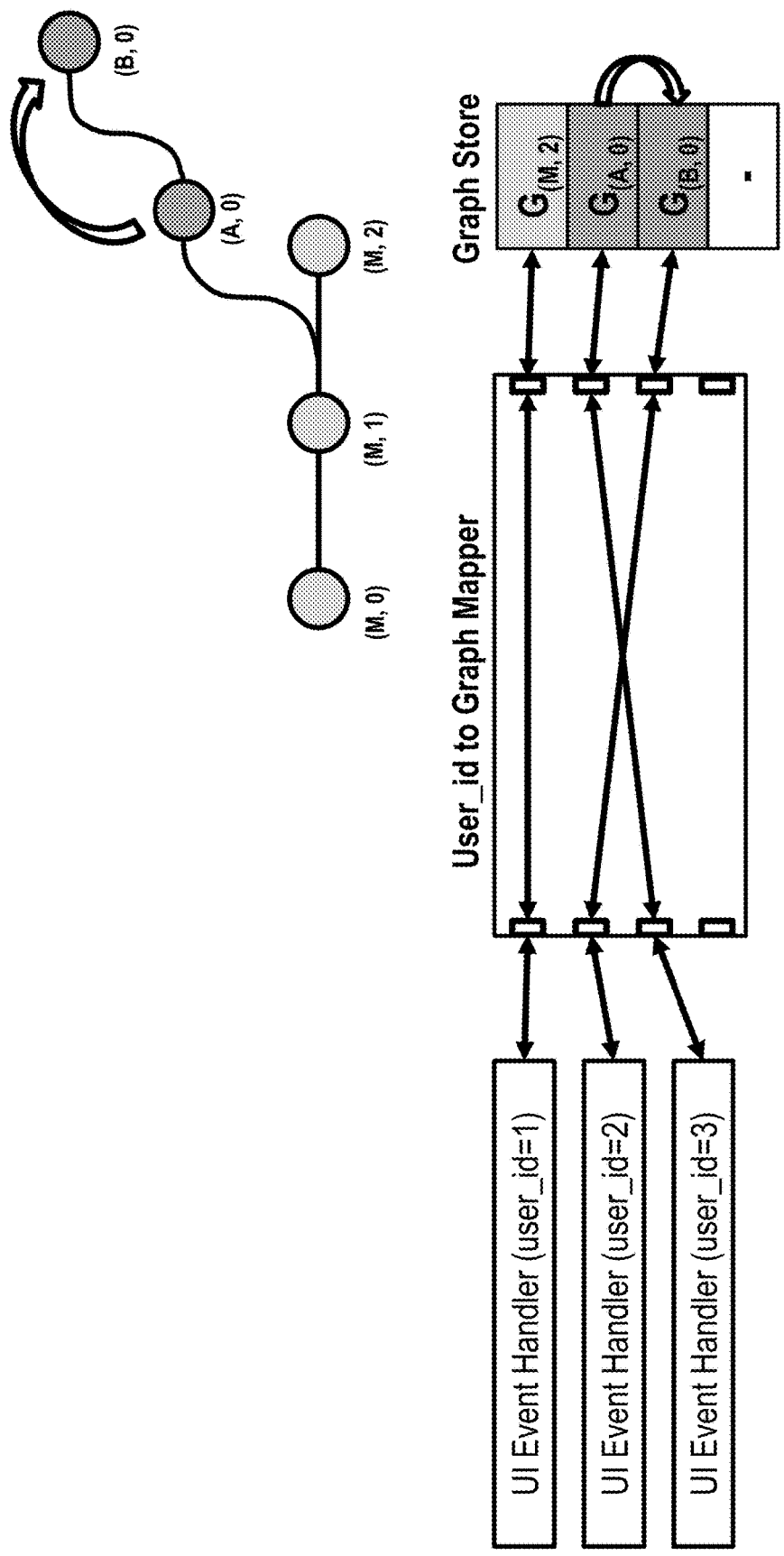
FIG. 9 is another diagram of multi-user concurrency.

FIG. 9 is another diagram of multi-user concurrency. Multiple read-only users can share the same (in memory), graph instance. As soon as a user wants to modify the graph, for example by testing the placement of a new service, they require their own instance. The graph branching and versioning strategy described in the previous section can address this. A new instance is created by incrementing the version of the current branch or by creating a new branch (shown). In either case the user making changes gets their own version-controlled graph instance and the other users are unaffected. FIG. 9 illustrates where a user 2 makes a change—Branch $G_{(A,0)}$ to $G_{(B,0)}$ and map user 2 to $G_{(B,0)}$.

All data needed to create a graph instance is stored in the P2 like DB. For up to very roughly 10 simultaneous in-memory graph instances all graph instances as well as the database can live on the same physical server.

Figure 10:
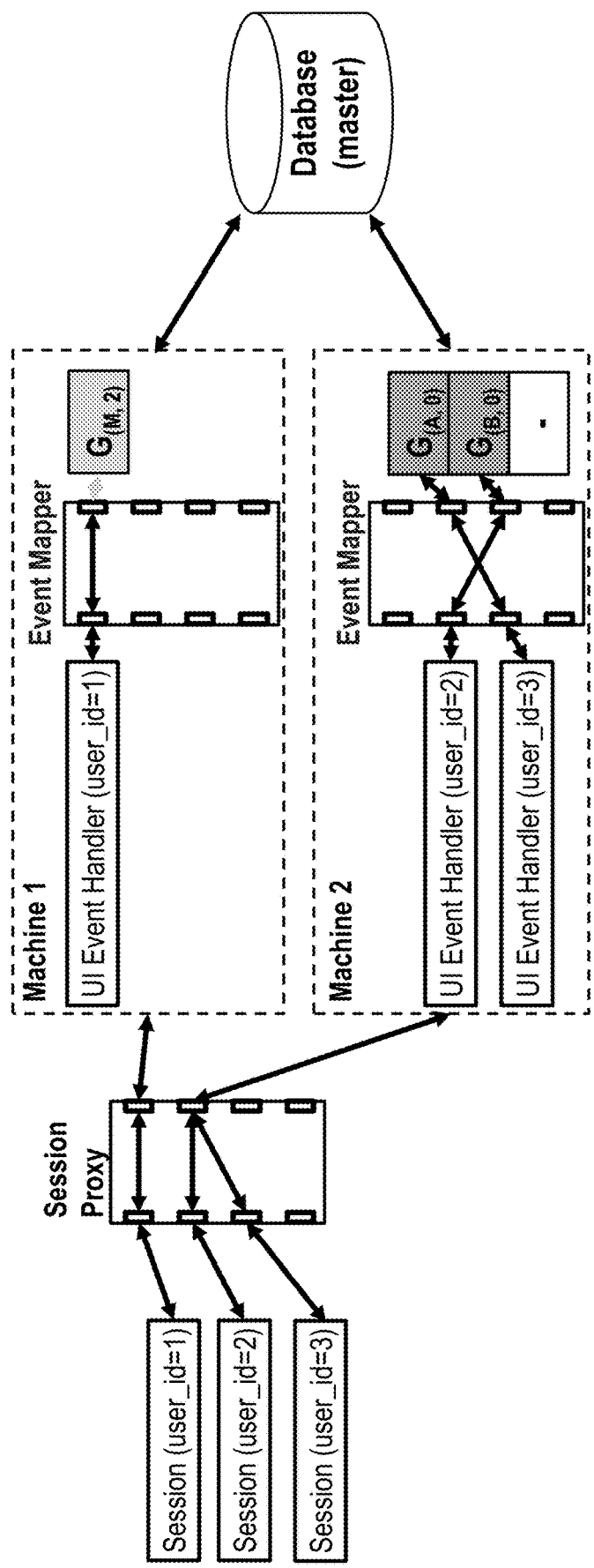
FIG. 10 is yet another diagram of multi-user concurrency, namely for a large number of users.

FIG. 10 is yet another diagram of multi-user concurrency, namely for a large number of users. For hundreds of users, graphs can reside on different physical machines. A session proxy routes user requests to the server that their branch and version is hosted on. Within a host the event mapper maps the user request to the correct graph instance. Many servers can share the same Postgres server.

Figure 11:
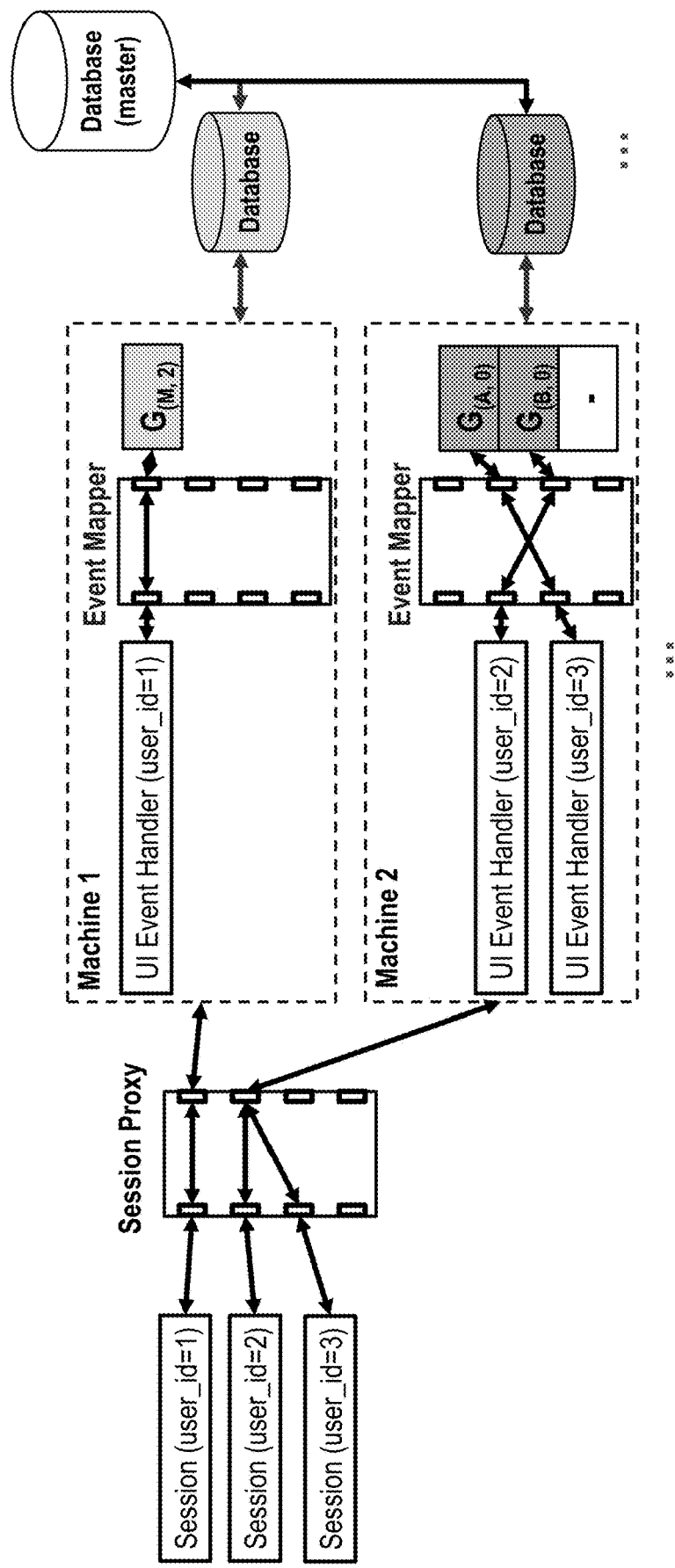
FIG. 11 is yet another diagram of multi-user concurrency, namely for a large number of users at web scale.

FIG. 11 is yet another diagram of multi-user concurrency, namely for a large number of users at web scale. At web scale branches and versions of the P2 like DB are distributed across multiple physical PostgreSQL servers. The graph branching and versioning model only requires the DB assigned to a given branch and version to maintain ACID consistency within that version. Changes to different branches are independent and only require the master server to maintain eventual consistency.

Summary

Again, we propose a general framework for representing network graphs which provide a basis for tools such as those used for network analysis, routing and spectral assignment, alarm correlation, visualization, and the like. It includes the following components:

1) Lazy graph construction with compression:
   Sub-graphs can be defined for the problem to be solved. Generator functions on individual nodes can generate sub-graphs as needed.
   Compression functions can be created to answer specific questions without necessarily constructing or traversing the sub-graph. For example, results from earlier asks can be cached.
2) One source of truth (Database Backend):
   Users can define sub-graph generator and compression functions that are specific to their needs. The DB contains everything that is known about the network. Generators are passed the keys for the node that they are called from which may include the node name and related ports. Those keys can be used to reach any network state information in the DB that is required to build the desired sub-graph.
   An ORM can perform egger fetching of object attributes to minimize DB interactions. Most importantly it maintains synchronization among instances of the same object on disparate sub-graphs.
3) Intelligent Dijkstra (and related algorithms):
   Application specific Dijkstra kernels can be written which look for and use the sub-graphs and compression functions that have been placed on the nodes.
4) Graph Versioning:
   All relevant network state information is stored in a relational database. Entries in the database can be versioned with the time range of applicability as well as a unique branch ID. This makes it possible to try various 'what if' scenarios on a branch while our current view of the as-built network state (master branch) is continuously updated.
5) Multi-User Concurrency:
   The ability to fully construct the network state from the underlying database and to version the data in that database allows user request to be directed to their chosen branch and version of the design. Multiple read-only users can share the same graph instance and that design can branch when a user changes the graph.

Database Design

In-memory graphs and select sub-graphs are used to represent network topology. Processes such as routing that are tightly tied to topology will operate on the graphs. Other operations such as identifying nodes that share a common domain, or services that cross a particular fiber may be best served by relational queries.

To enable users to easily construct different types of network graphs, it is necessary to provide network state information in a normalized form where data needed to build a particular graph can be easily found.

Process

Figure 12:
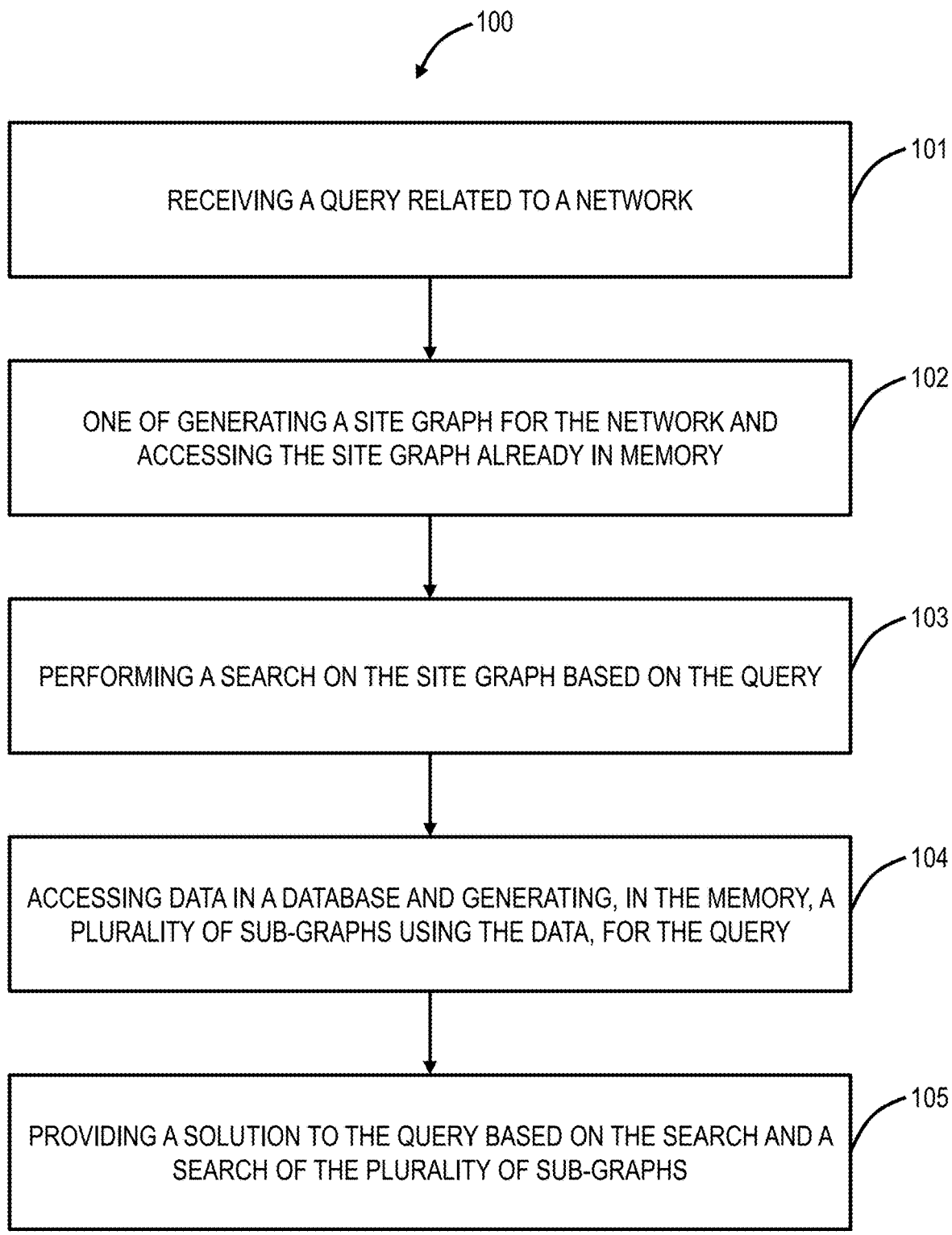
FIG. 12 is a flowchart of a process for lazy graph construction with compression.

FIG. 12 is a flowchart of a process 100 for lazy graph construction with compression. The process 100 contemplates implementation/realization as a method having steps, execution via a processing apparatus 200 (FIG. 13), and as instructions stored in a non-transitory computer-readable medium.

The process 100 includes receiving a query related to a network (step 101); one of generating a site graph for the network and accessing the site graph already in memory (step 102); performing a search on the site graph based on the query (step 103); accessing data in a database and generating, in the memory, a plurality of sub-graphs using the data, for the query (step 104); and providing a solution to the query based on the search and a search of the plurality of sub-graphs (step 105).

This is a hybrid graph-relational model for representing network topology. The full network state information is contained in a database and the portion of that information that is expected to be needed for a given query, application, or algorithm is loaded into memory in the form of an in-memory graph.

The site graph can be at a site level and includes network elements and associated connections in the network, and the plurality of sub-graphs can be at an intra-site level or intra-edge level including any of component-to-component connections and intra-component connections. The generating is based on pre-defined generator functions that include instructions for the sub-graphs which are attached to a specific node in the network. Any node or edge in the network can include a plurality of generator functions. Generator functions may also be attached to the site graph itself.

References to site graphs should be understood to include any representation of the network. For example, the network may be represented as nodes where the nodes are network shelves and the edges are the connections between those shelves.

The process 100 includes a mechanism for attaching generator functions to individual nodes and edges of the in-memory graph where those generator functions contain instructions for generating sub-graphs below the node (edge) to which the generator is attached. The name, or key, of the node or edge to which the generator is attached is used along with the instructions to reach into the database to find all data required to construct the desired sub-graph. The generator functions may access other data sources such as additional databases, files, micro services, public data sources etc.

Multiple generators can be attached to any node (edge) in the graph, and it is possible to define new generators to address a specific user need. For example, a ROADM could be represented as the set of all port level connections within the site and all of the cards that those connections run between. Alternatively, the ROADM could be represented in terms of a graph of 'degrees'.

A sub-graph can be built below a node (edge) on a parent graph by a generator function attached to that node (edge). Generators can also be attached to the nodes and edges of the sub-graph. For example, a generator could be defined that builds a graph with the internal structure of a WSS. Starting from the network level graph a site node can have a port level ROADM sub-graph under it. The port level graph may have a WSS node to which a sub-graph is attached with the internal structure of the WSS.

The process 100 can further include utilizing a compression function associated with any node where the compression function includes logic for answering specific questions. In an embodiment, a plurality of sub-graphs include add/drop graphs at a source node and a destination node, and the compression function are used at intermediate nodes for degree-to-degree interconnectivity.

Compression functions attached to nodes or edges can contain instructions for answering specific questions. For example, a compression function attached to a ROADM site may answer the question "For a service entering on a given port at a given wavelength what outgoing ports can be reached from here?". The compression function may call the ROADM sub-graph generator to build and traverse the sub-graph. It may also be able to answer that question based on an earlier cached result or determine the answer by using internal algorithms and data from queries to the relational database.

The use of compression functions can dynamically calculate rules, such as connectivity rules, based on one or more factors that contribute to those rules. (baud rate, clock recovery mode, filter shape . . . ).

The compression functions, as well as generators, are created for individual network elements. An example of a compression function attached to a CCMD node may simply contain the one-to-many mapping between ports and answer questions like 'what ports can be reached from here at a given wavelength'. More advanced functions may determine filter penalties or perform noise modeling. The model may be for the general class of CCMDs or specialized to a particular component. The compression functions or generators can be automatically built starting from a general definition for that class of cards and then reflect details taken from card definition files such as extensible markup language (XML) card definition files or other data modeling languages such as YANG.

The query can be a request for a path, and the solution includes any of a wavelength, connectivity for add/drop, a network path, and connectivity at intermediate nodes. The search and the generating can be performed asynchronously to one another.

The process 100 can include utilizing graph versioning with branching and merging such that the site graph supports multi-user concurrent operation. This can include incrementally updating a graph represented by a hybrid graph relational model such as in response to updates from the live network by way of a subscription to a Kafka or other bus. This can also include enabling web applications with multi-user concurrency where event handlers for multiple users are each routed to appropriate in-memory representations of the network graph. This can further include enabling web applications where users performing read-only operations on the same branch and version of the graph may have their requests routed to the same in-memory representation.

The process 100 can include utilizing graph versioning to store multiple representations of a network and the relationships between those representations. Graph versioning is used to store incremental changes to the state of a network and where a branching method is used to track two or more distinct sets of incremental changes to the network topology that originate from a common topology. A merging is used to combine the topology representation from two or more branches into a common merged representation where conflicts between branches are resolved automatically or with the assistance of an operator. Graph versioning with branching is used to enable isolation between two or more concurrent users where one or more users may alter the network state within their branch without impacting the graph representation used by other users in a multi-tenant application.

This also includes enabling web applications where a new branch or version of an in-memory graph is automatically created for a user who needs to write to an in-memory graph representation where that graph may previously have been shared by multiple read only users. Note that for these claims 'in memory' refers to instances of the hybrid graph relational model and the branch/version of a graph may include any combination of in-memory elements and data sorted in the relational database or other durable data store.

Many of the examples for this model are expressed in terms of Layer 0 applications. The methods described herein can easily be extended to higher network layers. The methods described are application to any application where network topology is needed. Examples include routing, network defragmentation, alarm analysis, all types of machine learning and AI, network planning, network visualization etc.

Processing Apparatus

Figure 13:
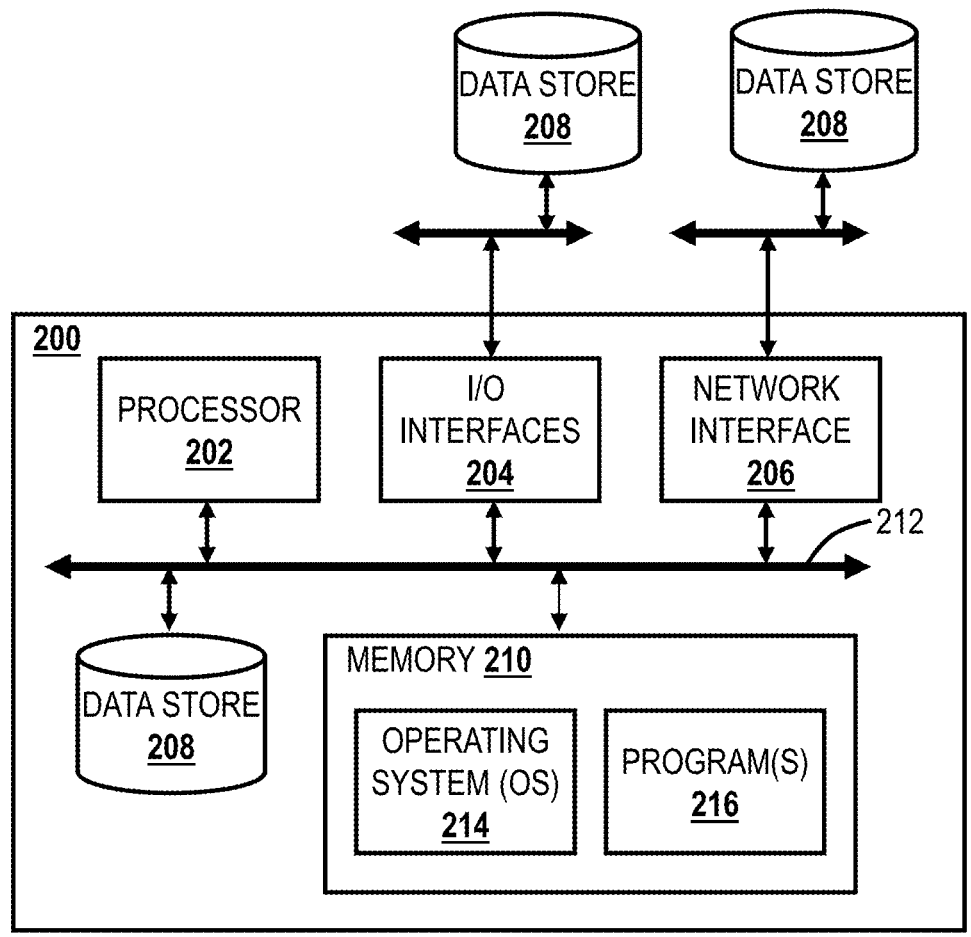
FIG. 13 is a block diagram of a processing apparatus.

FIG. 13 is a block diagram of a processing apparatus 200. The apparatus 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the apparatus 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the apparatus 200, a semiconductor-based microprocessor (in the form of a microchip or chipset), or generally any device for executing software instructions. When the apparatus 200 is in operation, the processor 202 is configured to execute software stored within the memory 210, to communicate data to and from the memory 210, and to generally control operations of the apparatus 200 pursuant to the software instructions. The I/O interfaces 204 may be used to receive user input from and/or for providing system output to one or more devices or components. The user input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the apparatus 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (W LAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the apparatus 200 such as, for example, an internal hard drive connected to the local interface 212 in the apparatus 200. Additionally, in another embodiment, the data store 208 may be located external to the apparatus 200 such as, for example, an external hard drive connected to the I/O interfaces 204 (e.g., SCSI or USB connection). In a further embodiment, the data store 208 may be connected to the apparatus 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause one or more processors to perform steps of:
   receiving a query related to a network, wherein the query is a request for a path in the network;
   one of generating a site graph for the network and accessing the site graph already in memory;
   performing a search on the site graph based on the query;
   accessing data in a database and generating, in the memory, a plurality of sub-graphs using the data, for the query such that the plurality of sub-graphs are generated based on and only if necessary to answer specific questions associated with the query; and
   providing a solution to the query based on the search and a search of the plurality of sub-graphs, wherein the solution included a wavelength, connectivity of the wavelength for add/drop, a path between nodes in the network, and connectivity at intermediate nodes in the network,
   wherein the site graph is at a site level and includes network elements and associated connections in the network, and the plurality of sub-graphs are at an intra-site level including any of component-to-component connections and intra-component connections.

2. The non-transitory computer-readable medium of claim 1, wherein each sub-graph of the plurality of sub-graphs represents details of a vertex in a higher level graph.

3. The non-transitory computer-readable medium of claim 1, wherein the generating is based on pre-defined generator functions that include instructions for the sub-graphs which are attached to a specific node or edge in the network or to the network graph itself.

4. The non-transitory computer-readable medium of claim 3, wherein any node, edge or graph in the network includes a plurality of generator functions.

5. The non-transitory computer-readable medium of claim 1, wherein the steps further include utilizing a compression function associated with any node where the compression function includes instructions for answering specific questions.

6. The non-transitory computer-readable medium of claim 5, wherein the plurality of sub-graphs include add/drop graphs at a source node and a destination node, and
   wherein the compression function are used at intermediate nodes for degree-to-degree interconnectivity.

7. The non-transitory computer-readable medium of claim 1, wherein the search and the generating are performed asynchronously to one another.

8. The non-transitory computer-readable medium of claim 1, wherein the steps further include
   utilizing graph versioning to store multiple representations of a network and relationships between those representations.

9. The non-transitory computer-readable medium of claim 1, wherein the steps further include
   utilizing an object relational mapper (ORM) to manage graph objects in the database.

10. A method comprising steps of:
    receiving a query related to a network, wherein the query is a request for a path in the network;
    one of generating a site graph for the network and accessing the site graph already in memory;
    performing a search on the site graph based on the query;
    accessing data in a database and generating, in the memory, a plurality of sub-graphs using the data, for the query such that the plurality of sub-graphs are generated based on and only if necessary to answer specific questions associated with the query; and
    providing a solution to the query based on the search and a search of the plurality of sub-graphs, wherein the solution included a wavelength, connectivity of the wavelength for add/drop, a path between nodes in the network, and connectivity at intermediate nodes in the network,
    wherein the site graph is at a site level and includes network elements and associated connections in the network, and the plurality of sub-graphs are at an intra-site level including any of component-to-component connections and intra-component connections.

11. The method of claim 10, wherein each sub-graph of the plurality of sub-graphs represents details of a vertex in a higher level graph.

12. The method of claim 10, wherein the generating is based on pre-defined generator functions that include instructions for the sub-graphs which are attached to a specific node or edge in the network or to the network graph itself.

13. The method of claim 12, wherein any node, edge or graph in the network includes a plurality of generator functions.

14. The method of claim 10, wherein the steps further include
    utilizing a compression function associated with any node where the compression function includes instructions for answering specific questions.

15. The method of claim 14, wherein the plurality of sub-graphs include add/drop graphs at a source node and a destination node, and
    wherein the compression function are used at intermediate nodes for degree-to-degree interconnectivity.

16. The method of claim 10, wherein the search and the generating are performed asynchronously to one another.

17. The method of claim 10, wherein the steps further include
    utilizing graph versioning with branching and merging such that the site graph supports multi-user concurrent operation.

18. The method of claim 10, wherein the steps further include utilizing an object relational mapper (ORM) to manage graph objects in the database.

19. The method of claim 10, wherein the site graph includes at least a pair of reconfigurable optical add/drop multiplexer (ROADM) graphs for the add/drop, one or more intermediate node graphs for the connectivity at the intermediate nodes, and associated sub-graphs for the ROADM graphs and the intermediate node graphs.

20. The non-transitory computer-readable medium of claim 1, wherein the site graph includes at least a pair of reconfigurable optical add/drop multiplexer (ROADM) graphs for the add/drop, one or more intermediate node graphs for the connectivity at the intermediate nodes, and associated sub-graphs for the ROADM graphs and the intermediate node graphs.

\* \* \* \* \*